(12) United States Patent
Shao et al.

(10) Patent No.: US 12,216,458 B2
(45) Date of Patent: Feb. 4, 2025

(54) INDUSTRIAL INTERNET OF THINGS (IoT) OF INTEGRATING CENTRALIZED PLATFORMS AND REAR SUB-PLATFORMS, CONTROL METHODS THEREOF, AND MEDIUM

(71) Applicant: CHENGDU QINCHUAN IOT TECHNOLOGY CO., LTD., Sichuan (CN)

(72) Inventors: Zehua Shao, Chengdu (CN); Yaqiang Quan, Chengdu (CN); Haitang Xiang, Chengdu (CN); Xiaojun Wei, Chengdu (CN); Bin Liu, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 410 days.

(21) Appl. No.: 17/807,710

(22) Filed: Jun. 17, 2022

(65) Prior Publication Data
US 2023/0409012 A1 Dec. 21, 2023

(51) Int. Cl.
G05B 19/418 (2006.01)
H04L 67/12 (2022.01)

(52) U.S. Cl.
CPC ... *G05B 19/41865* (2013.01); *G05B 19/4185* (2013.01); *H04L 67/12* (2013.01)

(58) Field of Classification Search
CPC .......... G05B 19/41865; G05B 19/4185; G05B 2219/32252; H04L 67/12
See application file for complete search history.

(56) References Cited

U.S. PATENT DOCUMENTS

| | | | |
|---|---|---|---|
| 10,575,072 B1* | 2/2020 | Shao | H04Q 9/00 |
| 2002/0094588 A1* | 7/2002 | Fan | G05B 19/41865 700/95 |

(Continued)

OTHER PUBLICATIONS

Shao, Zehua, Exploration and Research on the Structure of Internet of Things, Internet of Things Technologies Reliable Transmission, 2015, 10 pages.

(Continued)

*Primary Examiner* — Ziaul Karim
(74) *Attorney, Agent, or Firm* — METIS IP LLC

(57) ABSTRACT

The present disclosure discloses an industrial Internet of Things (IoT) of integrating centralized platforms and rear sub-platforms, the industrial IoT includes a user platform, a service platform, a management platform, a sensor network platform, and an object platform interacting in sequence, both the service platform and the sensor network platform are arranged using a centralized platform arrangement and the management platform is arranged using a rear sub-platform arrangement, the production line manufacturing equipment and the production line accessory supply equipment collect accessory data of corresponding equipment through the equipment data collectors and add the index item information through the management platform. Therefore, the corresponding index item information is classified and processed by sub-platforms of corresponding and different management platforms, so as to ensure the transmission and classification of data.

16 Claims, 6 Drawing Sheets

(56) References Cited

U.S. PATENT DOCUMENTS

| | | | | |
|---|---|---|---|---|
| 2002/0143951 | A1* | 10/2002 | Khan | H04L 65/612 |
| | | | | 709/227 |
| 2007/0133469 | A1* | 6/2007 | Shin | H04W 40/34 |
| | | | | 370/331 |
| 2014/0119204 | A1* | 5/2014 | Guo | H04L 45/48 |
| | | | | 370/252 |
| 2020/0326684 | A1* | 10/2020 | Chand | G05B 23/024 |

OTHER PUBLICATIONS

Shao, Zehua, The Internet of Things sense the world beyond the world, China Renmin University Press, 2017, 30 pages.

Shao, Zehua, Smart City Architecture, Internet of Things Technologies Intelligent Processing and Application, 2016, 7 pages.

White Paper on Urban Brain Development, Smart City Standard Working Group of National Beacon Commission, 2022, 59 pages.

* cited by examiner

INDUSTRIAL INTERNET OF THINGS (IoT) OF INTEGRATING CENTRALIZED PLATFORMS AND REAR SUB-PLATFORMS, CONTROL METHODS THEREOF, AND MEDIUM

TECHNICAL FIELD

The present disclosure relates to intelligent manufacturing technology, and more particularly to an industrial Internet of Things (IoT) of integrating centralized platforms and rear sub-platforms, and control methods thereof.

BACKGROUND

The use of intelligent production in the industry to realize the intelligent manufacturing of assembly line products is developing rapidly. The intelligent manufacturing of assembly line products involves multiple processes and equipment. In the intelligent manufacturing, each process and equipment may require dozens or hundreds of accessories to complete product assembly and manufacturing. For example, in the intelligent manufacturing of electronic products, a process may require dozens or hundreds of micro-electronic accessories, and these accessories need to be configured completely based on the processing tasks or processing time in real time, so that the counts of accessories can ensure the smooth implementation of manufacturing during the intelligent manufacturing.

In the prior art, the accessories in many processes and equipment are the same, such as common resistors, diodes, sealing rings, screws, washers, etc. When supplying accessories, the similar accessories are supplied separately, which will lead to configuration counts of accessories for some processes or equipment is excessive and accumulation, while the configuration counts of accessories for some processes or equipment is small and need to be re-allocated from the accessories supply chain, which is not only unable to carry out unified scheduling, management and statistics of the same accessories, but also leads to waste of accessory resources.

Therefore, how to effectively carry out unified supply of similar accessories and reasonable allocation of resources is a technical problem that we urgently need to solve.

SUMMARY

The technical problem to be solved by the present disclosure is to provide an industrial Internet of Things (IoT) of integrating centralized platforms and rear sub-platforms. Through the unified management of production equipment and supply equipment, similar accessories can be reasonably scheduled and allocated to ensure that satisfying the manufacturing tasks and realizing the reasonable coordination and integration of resources at the same time. Using the reasonable architecture design of the IoT, it can make full use of the information processing, transmission and storage capabilities of different architectures, different information and data are classified or centrally processed, and the data processing speed is fast, which can well achieve accessories management and allocation scheduling.

The present disclosure is realized by the following technical solutions.

An industrial IoT of integrating centralized platforms and rear sub-platforms includes a user platform, a service platform, a management platform, a sensor network platform, and an object platform interacting in sequence. The user platform is configured as a terminal device, which interacts with users; the service platform is configured as a first server, which extracts information required for processing the user platform from the management platform, and sends the information to the user platform; the management platform is configured as a second server, which controls the operation of the object platform, and receives feedback data from the object platform; the sensor network platform is configured as a communication network and a gateway for the object platform and the management platform to interact; the object platform is configured as production line equipment for executing intelligent manufacturing and equipment data collectors.

Both the service platform and the sensor network platform are arranged using a centralized platform arrangement, and the management platform is arranged using a rear sub-platform arrangement; the centralized platform arrangement refers to that the service platform or the sensor network platform uniformly receives data, uniformly processes data, and uniformly sends data; the rear sub-platform arrangement refers to the management platform provided with a main platform and a plurality of sub-platforms, the main platform uniformly receives data uploaded by the sensor network platform, and sends the data to corresponding sub-platforms according to a type of the data or data uploaded by different objects, and the plurality of sub-platforms further store and process the received data and send the data to the service platform; the plurality of sub-platforms respectively store and process the data of different types or different receiving objects sent by the service platform, the main platform stores, processes, and transmits the data to the sensor network platform after summarizing the data of the plurality of sub-platforms.

Production line equipment of the object platform is divided into production line manufacturing equipment and production line accessory supply equipment according to classification, and each of the production line manufacturing equipment and each of the production line accessory supply equipment are configured with equipment data collectors of the object platform.

When the production line manufacturing equipment and the production line accessory supply equipment perform intelligent operations, the equipment data collectors of the object platform collect accessory data of corresponding equipment and send the accessory data to the sensor network platform.

The sensor network platform receives the accessory data, generates different index item information corresponding to the production line manufacturing equipment or the production line accessory supply equipment, processes the integrated data and generates a plurality of accessory data packages that are recognized by the management platform after integrating the accessory data and the corresponding index item information, uniformly packages the plurality of accessory data packages, and sends the packaged accessory data packages to the main platform of the management platform.

After receiving the packaged accessory data packages, the main platform of the management platform processes the packaged accessory data packages to obtain a plurality of accessory data packages with the index item information, analyzes the index item on the accessory data packages, and sends the plurality of the accessory data packages to the sub-platforms of different management platforms according to the different index item information.

The sub-platforms of the management platform receive corresponding accessory data packages to perform data operation, store results of the data operation, generate data files recognized by the service platform, and send the data files to the service platform.

The service platform receives and stores the data files, and sends the data files to the user platform, the user platform sends accessory adjustment instructions based on the data files, and the service platform executes accessory adjustment operations according to the accessory adjustment instructions.

Based on the above-mentioned solution of the industrial IoT of integrating centralized platforms and rear sub-platforms, the equipment data collectors of the object platform collect accessory data of corresponding equipment including following operations.

The equipment data collectors of the production line manufacturing equipment collect a storage amount of accessories of the corresponding equipment and consumption time of a single accessory.

Based on the above-mentioned solution of the industrial IoT of integrating centralized platforms and rear sub-platforms, the data operation includes following operations.

When the sub-platforms of the management platform correspond to the production line manufacturing equipment, the sub-platforms of the corresponding management platform receive the accessory data packages and calculate a total amount of the required accessories within a total required working hour by following formula:

$$S = T_{total}/T_{single}$$

where S means the total amount of the required accessories, $T_{total}$ means the total working hour, $T_{single}$ means the consumption time of a single accessory, and the total working hour means total time preset by the sub-platforms of the management platform based on production tasks.

The sub-platforms of the corresponding management platform obtain a supply amount of the accessories using the total amount of the required accessories minus the storage amount of the accessories, the supply amount of the accessories retaining positive sign and negative sign, and generate the data files recognized by the service platform and send the data files to the service platform after storing the supply amount of the accessories.

Based on the above-mentioned solution of the industrial IoT of integrating centralized platforms and rear sub-platforms, the data operation further includes following operations.

When the sub-platforms of the management platform correspond to the production line accessory supply equipment, the sub-platforms of the corresponding management platform receive the accessory data packages, directly store the accessory data packages, and generate the data files recognized by the service platform and send the data files to the service platform.

Based on the above-mentioned solution of the industrial IoT of integrating centralized platforms and rear sub-platforms, the service platform executes accessory adjustment operations according to the accessory adjustment instructions including following operations.

After receiving the accessory adjustment instructions, the service platform obtains a total supply amount of the accessories through summing absolute values of the supply amount of the accessories with the negative sign.

When the storage amount of the accessories of the production line accessory supply equipment is greater than or equal to the total supply amount of the accessories, the service platform sends supply instructions to the sub-platforms of the management platform corresponding to the production line accessory supply equipment by the service platform, the supply instructions at least including the index item information of the production line equipment corresponding to the supply amount of the accessories with negative signs and the absolute values of the supply amount of the accessories.

After receiving the supply instructions, the sub-platforms of the management platform store the supply instructions and send the supply instructions to the main platform of the management platform.

The main platform of the management platform analyzes the supply instructions after receiving the supply instructions, integrates the corresponding index item information and the absolute values of the accessory supply amount, packages the integrated data to generate data packages recognized by the sensor network platform, and sends the data packages to the sensor network platform.

The sensor network platform receives the data packages, generates configuration files recognized by the corresponding production line accessory supply equipment, and sends the configuration files to the production line accessory supply equipment.

The production line accessory supply equipment supplies the accessories on different production line manufacturing equipment based on the corresponding index item information in the data packages and the absolute values of the supply amount of the accessories.

Based on the above-mentioned solution of the industrial IoT of integrating centralized platforms and rear sub-platforms, when the storage amount of the accessories of the production line accessory supply equipment is less than the total amount of required accessories, the service platform obtains a supply difference of the accessories using the total amount of the accessories minus the storage amount of the accessories.

Based on the supply difference of the accessories, the service platform sends the supply instructions to the sub-platforms of the management platform corresponding to the production line accessory supply equipment, and supplies accessories with an amount being greater than or equal to the supply difference of the accessories by the production line accessory supply equipment after obtaining the supply instructions; after the production line accessory supply equipment completing the supplying, the service platform executes a supply step when the storage amount of the accessories of the production line accessory supply equipment is greater than or equal to the total amount of the accessories.

Based on the above-mentioned solution of the industrial IoT of integrating centralized platforms and rear sub-platforms, when the service platform sends the supply instructions to the sub-platforms of the management platform corresponding to the production line accessory supply equipment and the production line accessory supply equipment fail to supply the accessories after obtaining the supply instructions, the service platform executes the following operations.

The service platform retrieves the index item information of the production line manufacturing equipment corresponding to the supply amount of the accessories with positive signs and the supply amount of the accessories, and obtains an allocation amount of the accessories through summing the supply amount of the accessories.

The service platform obtains a single allocation amount of the accessories for each production line manufacturing equipment according to following formulas.

When the total amount of the accessories is greater than the allocation amount of the accessories, the service platform obtains the single allocation amount of the accessories for each production line manufacturing equipment according to formula (1):

$$S=S'/T_{total} \times S_{total} \qquad (1)$$

When the total amount of the accessories is less than the allocation amount of the accessories, the service platform obtains the single allocation amount of the accessories for each production line manufacturing equipment according to formula (2):

$$S=S'/S_{total} \times T_{total} \qquad (2)$$

where S means the single allocation amount of the accessories for each production line manufacturing equipment, S' means the supply amount of the accessories of the corresponding production line manufacturing equipment, $S_{total}$ means the allocation amount of the accessories, and $T_{total}$ means the total amount of the accessories.

After integrating the index item information of the corresponding production line manufacturing equipment and the single allocation amount of the accessories, the sever platform packages and sends the data packages to the sub-platforms of the management platform corresponding to the production line accessory supply equipment, and then after packaging through the main platform of the management platform, sends the data packages to the production line accessory supply equipment through the sensor network platform.

After obtaining the data packages, the production line accessory supply equipment retrieves the accessories of the corresponding production line manufacturing equipment based on the index item information of the corresponding production line manufacturing equipment and the single allocation amount of the accessories.

After completing the retrieving, the production line accessory supply equipment executes a supply step when the storage amount of the accessories of the production line accessory supply equipment is greater than or equal to the total amount of the accessories.

Based on the above-mentioned solution of the industrial IoT of integrating centralized platforms and rear sub-platforms, when the single allocation amount of the accessories of the production line manufacturing equipment has a decimal, the decimal is discarded and an integer is used as the single allocation amount of the accessories.

Based on the above-mentioned solution of the industrial IoT of integrating centralized platforms and rear sub-platforms, the production line manufacturing equipment includes a plurality of etching equipment, and the equipment data collector collects consumption information of etching accessories of the plurality of etching equipment.

The sub-platforms of the management platform predict a consumption of etching solution of the plurality of etching equipment in a future time period based on the consumption information of the etching accessories.

The sub-platforms of the management platform determine a delivery amount and a delivery time of the etching solution corresponding to each of the plurality of etching equipment based on the consumption of the etching solution.

Based on the above-mentioned solution of the industrial IoT of integrating centralized platforms and rear sub-platforms, the sub-platforms of the management platform predict a consumption of etching solution of the plurality of etching equipment in a future time period including the following operations.

The sub-platforms of the management platform predict a unit etching speed and a unit consumption of the etching solution in a preset manner based on information of the etching solution in the consumption information of the etching accessory and working parameters of the etching equipment.

The sub-platforms of the management platform determine the consumption of the etching solution based on the unit etching speed and the unit consumption of the etching solution.

Based on the above-mentioned solution of the industrial IoT of integrating centralized platforms and rear sub-platforms, the information of the etching solution and the working parameters of the etching equipment are input into a first model, and the first model outputs the unit etching speed and the unit consumption of the etching solution.

Based on the above-mentioned solution of the industrial IoT of integrating centralized platforms and rear sub-platforms, the sub-platforms of the management platform determine a delivery amount of the etching solution corresponding to each of the plurality of etching equipment including the following operations.

The sub-platforms of the management platform determine a residual etching solution in the future time period based on a predicted consumption of the etching solution.

The sub-platforms of the management platform determine that the etching solution is needed to be delivered to the etching equipment when the residual etching solution is less than a threshold.

Based on the above-mentioned solution of the industrial IoT of integrating centralized platforms and rear sub-platforms, the sub-platforms of the management platform determine a delivery time of the etching solution corresponding to each of the plurality of etching equipment including the following operations.

The sub-platforms of the management platform obtain a delivery speed of the production line accessory supply equipment.

The sub-platforms of the management platform determine the delivery time of each of the plurality of etching equipment based on the delivery amount of the etching solution and the delivery speed corresponding to each of the plurality of etching equipment.

Based on the above-mentioned solution of the industrial IoT of integrating centralized platforms and rear sub-platforms, the obtaining a delivery speed of the production line accessory supply equipment includes the following operations.

The sub-platforms of the management platform obtain a count of the plurality of etching equipment that need to be delivered, and a total count of the plurality of etching equipment that need to be delivered.

The sub-platforms of the management platform determine the delivery speed through historical statistics based on the count of the plurality of etching equipment that need to be delivered and the total count of the plurality of etching equipment that need to be delivered.

The present disclosure also provides a control method for an industrial Internet of Things (IoT) of integrating centralized platforms and rear sub-platforms based on the above-mentioned industrial IoT of integrating centralized platforms and rear sub-platforms. The industrial IoT including a user platform, a service platform, a management platform, a sensor network platform, and an object platform interacting in sequence, the control method comprising following operations:

Production line equipment of the object platform is divided into production line manufacturing equipment and production line accessory supply equipment according to classification, and each of the production line manufacturing equipment and each of the production line accessory supply equipment are configured with equipment data collectors of the object platform.

When the production line manufacturing equipment and the production line accessory supply equipment perform intelligent operations, the equipment data collectors of the object platform collect accessory data of corresponding equipment and send the accessory data to the sensor network platform.

The sensor network platform receives the accessory data, generates different index item information corresponding to the production line manufacturing equipment or the production line accessory supply equipment, processes the integrated data and generates a plurality of accessory data packages that are recognized by the management platform after integrating the accessory data and the corresponding index item information, uniformly packages the plurality of accessory data packages, and sends the packaged accessory data packages to the main platform of the management platform.

After receiving the packaged accessory data packages, the main platform of the management platform processes the packaged accessory data packages to obtain a plurality of accessory data packages with the index item information, analyzes the index item on the accessory data packages, and sends the plurality of the accessory data packages to the sub-platforms of different management platforms according to the different index item information.

The sub-platforms of the management platform receive corresponding accessory data packages to perform data operation, store results of the data operation, generate data files recognized by the service platform, and send the data files to the service platform.

The service platform receives and stores the data files, and sends the data files to the user platform, the user platform sends accessory adjustment instructions based on the data files, and the service platform executes accessory adjustment operations according to the accessory adjustment instructions.

Compared with the prior art, the beneficial effects of the present disclosure are as follows: the present disclosure uses a five-platform structure to build the IoT, the sensor network platform adopts a centralized platform arrangement, which can uniformly manage and distribute the data of all the production line manufacturing equipment, production line accessory supply equipment, and equipment data collectors. It is convenient for data connection between the IoT and all devices, and reduces the data connection nodes with devices, and improves the security and stability of data arrangement, which can use the main platform of the management platform to process and summarize data and then use the sub-platforms of the management platform to perform data processing and data transmission separately correspond to different devices to form multiple identical or different independent data processing channel, the sub-platforms of each management platform can share a part of the operation for the main platform of the management platform, which effectively reduces the computing pressure of the main platform of the management platform and ensures that data is transmitted according to a specific path or processed by a specific server, ensuring data security and independence. Finally, the service platform adopts a centralized platform arrangement, which is convenient for summarizing all data or coordinated and unified processing all target objects, so that the service platform can better manage and control the IoT.

When in use, the production line manufacturing equipment and the production line accessory supply equipment may collect the accessory data of the corresponding equipment through the equipment data collectors and add the index item information through the management platform. Therefore, the corresponding index item information can be classified and processed by sub-platforms of corresponding and different management platforms, so as to ensure the transmission and classification of data. The data processing of the management platform is also shared by the main platform and each sub-platform, which can reduce the demand and pressure of data calculation. Finally, the accessories adjustment operation is executed through the accessories adjustment instructions, which can carry out the unified supply of accessories or the mutual scheduling of accessories based on the accessories data of each production line equipment or production line accessory supply equipment, so as to realize the automatic supply and scheduling of the same accessories, realize the reasonable utilization and integration of resources, and ensure the smooth progress of manufacturing.

Based on the above-mentioned industrial IoT of integrating centralized platforms and rear sub-platforms, the present disclosure provides a non-transitory computer-readable storage medium storing a set of instructions, when executed by at least one processor, causing the at least one processor to perform any one of the above-mentioned control method for the industrial Internet of Things (IoT) of integrating centralized platforms and rear sub-platforms.

BRIEF DESCRIPTION OF THE DRAWINGS

The accompanying drawings described herein are used to provide further understanding of the embodiments of the present disclosure, which constitutes a part of the application, and do not limit the embodiments of the present disclosure, wherein.

DETAILED DESCRIPTION

In order to make the purpose, technical solutions and advantages of the present disclosure clearer, the present disclosure will be further described in detail below with reference to the embodiments and the accompanying drawings. The exemplary embodiments of the present disclosure and their descriptions are only used to explain the present disclosure, which are not intended to limit the present disclosure.

As used herein, the singular forms "a," "an," and "the" may be intended to include the plural forms as well, unless the context clearly indicates otherwise; and the plural forms may be intended to include the singular forms as well, unless the context clearly indicates otherwise.

Figure 1:
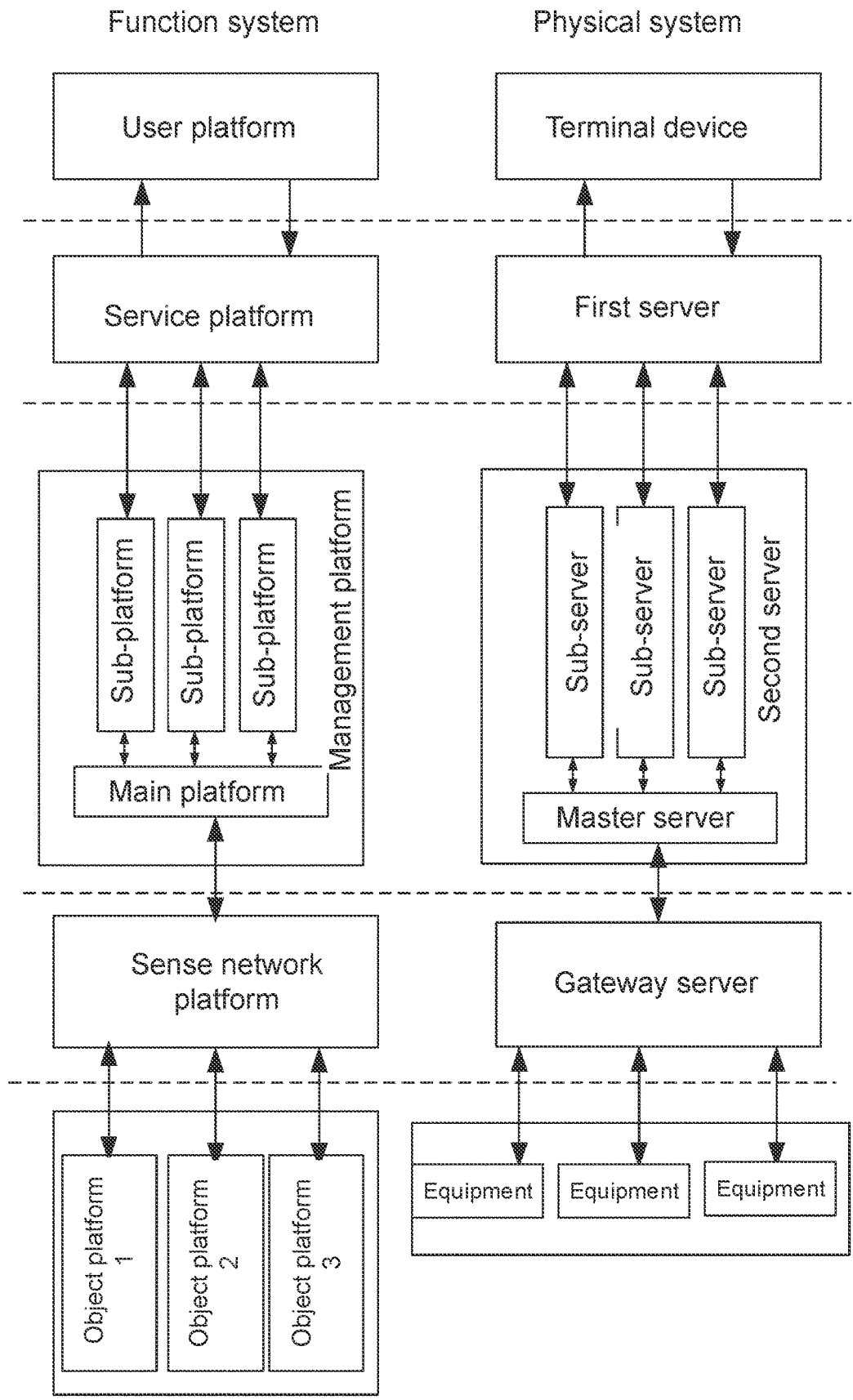
FIG. 1 is a structural frame diagram of an industrial Internet of Things (IoT) of integrating centralized platforms and rear sub-platforms according to some embodiments of the present disclosure.

FIG. 1 is a structural frame diagram of an industrial Internet of Things (IoT) of integrating centralized platforms and rear sub-platforms according to some embodiments of the present disclosure. As shown in FIG. 1, some embodiments of the present disclosure aim to provide an industrial Internet of Things (IoT) of integrating centralized platforms and rear sub-platforms, which may include a user platform, a service platform, a management platform, a sensor network platform, and an object platform interacting in sequence.

Both the service platform and the sensor network platform may be arranged using a centralized platform arrangement, and the management platform may be arranged using a rear sub-platform arrangement. The centralized platform arrangement may refer to that the service platform or the sensor network platform may uniformly receive data, uniformly process data, and uniformly send data. The rear sub-platform arrangement may refer to the management platform provided with a main platform and a plurality of sub-platforms, the main platform uniformly may receive data uploaded by the sensor network platform, and send the data to corresponding sub-platforms according to a type of the data or data uploaded by different objects, and the plurality of sub-platforms further may store and process the received data and send the data to the service platform, the plurality of sub-platforms may respectively store and process the data of different types or different receiving objects sent by the service platform, and the main platform may store, process, and transmit the data to the sensor network platform after summarizing the data of the plurality of sub-platforms.

Production line equipment of the object platform may be divided into production line manufacturing equipment and production line accessories supply equipment according to classification, and each of the production line manufacturing equipment and each of the production line accessory supply equipment may be configured with equipment data collectors of the object platform.

When the production line manufacturing equipment and the production line accessory supply equipment perform intelligent operations, the equipment data collectors of the object platform may collect accessory data of corresponding equipment and send the accessory data to the sensor network platform.

The sensor network platform may receive the accessory data, generate different index item information corresponding to the production line manufacturing equipment or the production line accessory supply equipment, process the integrated data and generate a plurality of accessory data packages that are recognized by the management platform after integrating the accessory data and the corresponding index item information, uniformly package the plurality of accessory data packages, and send the packaged accessory data packages to the main platform of the management platform.

After receiving the packaged accessory data packages, the main platform of the management platform may process the packaged accessory data packages to obtain a plurality of accessory data packages with the index item information, analyze the index item on the accessory data packages, and send the plurality of the accessory data packages to the sub-platforms of different management platforms according to the different index item information.

The sub-platforms of the management platform may receive corresponding accessory data packages to perform data operation, store results of the data operation, generate data files recognized by the service platform, and send the data files to the service platform.

The service platform may receive and store the data files, and send the data files to the user platform, the user platform may send accessory adjustment instructions based on the data files, and the service platform may execute accessory adjustment operations according to the accessory adjustment instructions.

As a specific configuration structure, the above-mentioned user platform may be configured as a terminal device, which interacts with users; the service platform may be configured as a first server, which extracts information required for processing the user platform from the management platform, and sends the information to the user platform; the management platform may be configured as a second server, which controls the operation of the object platform, and receives feedback data from the object platform; the sensor network platform may be configured as a communication network and a gateway for the object platform and the management platform to interact; and the object platform may be configured as production line equipment for performing intelligent manufacturing and equipment data collectors.

In the prior art, the accessories in many processes and equipment are the same, such as common resistors, diodes, sealing rings, screws, washers, etc. When supplying accessories, the similar accessories are supplied separately, which will lead to configuration counts of accessories for some processes or equipment is excessive and accumulation, while the configuration counts of accessories for some processes or equipment is small and need to be re-allocated from the accessories supply chain, which is not only unable to carry out unified scheduling, management and statistics of the similar accessories, but also lead to waste of accessories resources. In order to solve such problems, it is necessary to carry out unified data collection, sorting and resource allocation for all production equipment and supply equipment using the same accessories, which requires relatively large information transmission and processing capabilities, and requires relatively expensive cost input. With the increase in the counts of production equipment and supply equipment and the increase in the counts of accessories, the implementation difficulty will further increase, resulting in the inability to achieve unified data processing and resource allocation in the prior art.

Based on this, the embodiment uses the five-platform structure to build the IoT, the sensor network platform adopts a centralized platform arrangement, which can uniformly manage and distribute the data of all the production line manufacturing equipment, production line accessory supply equipment and equipment data collectors. It is convenient for data connection between the IoT and all devices, reduces the data connection nodes with devices, and improves the security and stability of data arrangement, which can use the main platform of the management platform to process and summarize data, and then use the sub-platforms of the management platform to perform data processing and transmission separately correspond to different devices to form multiple identical or different independent data processing channel, the sub-platform of each management platform can share a part of the operation for the main platform of the management platform, which effectively reduces the computing pressure of the main platform of the management platform and ensures that data is transmitted according to a specific path or processed by a specific server, ensuring data security and independence. Finally, the service platform adopts a centralized platform arrangement, which is convenient for summarizing all data or coordinated and unified processing all target objects, so that the service platform can better manage and control the IoT.

When in use, the production line manufacturing equipment and the production line accessory supply equipment may collect the accessory data of the corresponding equipment through the equipment data collectors and add the index item information through the management platform. Therefore, the corresponding index item information can be classified and processed by sub-platforms of corresponding and different management platforms, so as to ensure the transmission and classification of data. The data processing of the management platform is also shared by the main platform and each sub-platform, which can reduce the demand and pressure of data calculation. Finally, the accessories adjustment operation is executed through the accessories adjustment instructions, which can carry out the unified supply of accessories or the mutual scheduling of accessories based on the accessories data of each production line equipment or production line accessory supply equipment, so as to realize the automatic supply and scheduling of the same accessories, realize the reasonable utilization and integration of resources, and ensure the smooth progress of manufacturing.

It should be noted that the user platform in the embodiment may be a desktop computer, a tablet computer, a notebook computer, a mobile phone, or other electronic devices capable of data processing and data communication, which is not limited here. In specific applications, the first server and the second server may be a single server or a server cluster, which is not limited here. It should be understood that a process of the data processing mentioned in the embodiment may be processed by the processor of the server, and the data stored in the server may be stored in the storage device of the server, such as a hard disk and other memory. In specific applications, the sensor network platform may use multiple groups of gateway servers or multiple groups of intelligent routers, which are not limited here. It should be understood that a process of the data processing mentioned in the embodiments of the present disclosure may be processed by the processor of the gateway server, and the data stored in the gateway server may be stored in the storage device of the gateway server, such as hard disk and storages such as a solid state drive (SSD).

In some embodiments, the production line manufacturing equipment is various types of production line equipment supported by the assembly line in product manufacturing. Taking mechanical products as an example, the production line equipment may be component assembly equipment, assembly equipment, testing equipment, etc. Furthermore, in the field of intelligent manufacturing of electronic products, the production line manufacturing equipment may be PCB board pitting equipment, electronic device installation equipment, etc. Correspondingly, the production line accessory supply equipment may be acid addition equipment and alkali addition equipment of the pitting equipment, diode transmission equipment, resistance transmission equipment, etc. Furthermore, the equipment data collectors may be the data acquisition equipment of acid, alkali, diode, resistance, etc., corresponding to accessories, such as liquid level gauges, flow meters, counters, etc.

In some embodiments, accessory data may refer to accessory storage, transmission, or consumption of the corresponding device. Specifically, the accessory data may be the storage amount of the accessories of the production line manufacturing equipment and the consumption time of a single accessory, or the storage amount of the accessories of the production line accessory supply equipment. When the equipment data collectors of the object platform collect the accessory data of the corresponding device, the equipment data collectors of the production line manufacturing equipment may collect the storage amount of the accessories of the corresponding equipment and the consumption time of a single accessory, and the equipment data collectors of the production line accessory supply equipment may collect the storage amount of the accessories of the corresponding equipment.

In some embodiments, the sub-platforms of the management platform may perform data operation, and the specific operation method is as follows.

When the sub-platforms of the management platform correspond to the production line manufacturing equipment, the sub-platforms of the corresponding management platform may receive the accessory data packages and calculate a total amount of the required accessories within a total required working hour by following formula:

$$S = T_{total} / T_{single}$$

where S means the total amount of the required accessories, $T_{total}$ means the total working hour, $T_{single}$ means the consumption time of a single accessory, and the total working hour means total time preset by the sub-platforms of the management platform based on production tasks.

A supply amount of the accessories may be obtained using the total amount of the required accessories minus the storage amount of the accessories, the supply amount of the accessories may retain positive sign and negative sign, and the data files recognized by the service platform may be generated and the data files may be sent to the service platform after storing the supply amount of the accessories.

Through the above data operation, when the sub-platforms of the management platform preset the production time based on the production task, it may combine the consumption time of a single accessory collected by the data collectors to obtain the total amount of the required accessories S corresponding to the production line equipment. Then, based on the storage amount of the accessories, the difference of the required accessories corresponding to the production line manufacturing equipment in the total working hour $T_{total}$ is obtained, that is, the supply amount of the accessories that need to be supplied, so that the amount of accessories may be obtained that the corresponding production line manufacturing equipment needs to be supplied.

It should be noted that the supply amount of the accessories retains a positive sign and a negative sign. When the supply amount of the accessories is negative, it means that the storage amount of accessories is insufficient, and the accessories with the supply amount need to be supplied. When the supply amount of the accessories is positive, it means that the storage amount of the accessories of the corresponding production line equipment in the total working hour $T_{total}$ exceeds the total amount of required accessories, and the accessories do not need to be supplied.

In some embodiments, when the sub-platforms of the management platform correspond to the production line accessory supply equipment, the sub-platforms of the corresponding management platform may receive the accessory data packages, directly store the accessory data packages, and generate the data files recognized by the service platform and send the data files to the service platform.

In some embodiments, after the service platform obtains the accessory retrieval instructions, it is indicated that the production line needs to supply and retrieve the corresponding accessory, which includes following execution operations.

After receiving the accessory adjustment instructions, a total supply amount of the accessories may be obtained by the service platform through summing absolute values of the supply amount of the accessories with the negative sign.

When the storage amount of the accessories of the production line accessory supply equipment is greater than or equal to the total supply amount of the accessories, supply instructions may be sent to the sub-platforms of the management platform corresponding to the production line accessory supply equipment by the service platform, the supply instructions at least including the index item information of the production line equipment corresponding to the supply amount of the accessories with negative signs and the absolute values of the supply amount of the accessories.

After receiving the supply instructions, the supply instructions may be stored and sent to the main platform of the management platform by the sub-platforms of the management platform.

The supply instructions may be analyzed by the main platform of the management platform after receiving the supply instructions, the corresponding index item information and the absolute values of the accessory supply amount may be integrated, the integrated data may be packaged to generate data packages recognized by the sensor network platform, and the data packages may be sent to the sensor network platform.

The data packages may be received by the sensor network platform, configuration files recognized by the corresponding production line accessory supply equipment may be generated, and the configuration files may be sent to the production line accessory supply equipment.

The accessories may be supplied on different production line manufacturing equipment by the production line accessory supply equipment based on the corresponding index item information in the data packages and the absolute values of the supply amount of the accessories.

In this execution operation, the production line accessory supply equipment, the corresponding index item information, and the absolute values of the supply amount of the accessories may be used to supply the accessories on different production line equipment, so as to ensure that each production line manufacturing equipment with insufficient supply amount of the accessories may meet the required supply amount of the accessories during the execution of the manufacturing task to realize the automatic and reasonable allocation of resources.

In some embodiments, when the storage amount of the accessories of the production line accessory supply equipment is less than the total amount of the required accessories, indicating that the storage amount of the accessories of the production line accessory supply equipment is insufficient, which includes following execution operations.

When the storage amount of the accessories of the production line accessory supply equipment is less than the total amount of required accessories, a supply difference of the accessories may be obtained using the total amount of the accessories minus the storage amount of the accessories.

Based on the supply difference of the accessories, the supply instructions of the accessories may be sent to the sub-platforms of the management platform corresponding to the production line accessory supply equipment by the service platform, and accessories with an amount being greater than or equal to the supply difference of the accessories may be supplied by the production line accessory supply equipment after obtaining the supply instructions. After completing the supplying, a supply step may be executed by the production line accessory supply equipment when the storage amount of the accessories of the production line accessory supply equipment is greater than or equal to the total amount of the accessories.

In some embodiments, when the service platform sends the supply instructions to the sub-platforms of the management platform corresponding to the production line accessory supply equipment and the production line accessory supply equipment fail to supply the accessories after obtaining the supply instructions, which includes following execution operations.

The index item information of the production line manufacturing equipment corresponding to the supply amount of the accessories with positive signs and the supply amount of the accessories may be retrieved, and an allocation amount of the accessories may be obtained through summing the supply amount of the accessories by the service platform.

A single allocation amount of the accessories may be obtained for each production line manufacturing equipment according to following formulas.

When the total amount of the accessories is greater than the allocation amount of the accessories, the single allocation amount of the accessories may be obtained for each production line manufacturing equipment according to formula (1):

$$S = S'/T_{total} \times S_{total} \quad (1)$$

When the total amount of the accessories is less than the allocation amount of the accessories, the single allocation amount of the accessories may be obtained for each production line manufacturing equipment according to formula (2):

$$S = S'/S_{total} \times T_{total} \quad (2)$$

where S means the single allocation amount of the accessories for each production line manufacturing equipment, S' means the supply amount of the accessories of the corresponding production line manufacturing equipment, $S_{total}$ means the allocation amount of the accessories, and $T_{total}$ means the total amount of the accessories.

After integrating the index item information of the corresponding production line manufacturing equipment and the single allocation amount of the accessories, the data packages may be packaged and sent to the sub-platforms of the management platform corresponding to the production line accessory supply equipment, and then after packaging through the main platform of the management platform, the data packages may be sent to the production line accessory supply equipment through the sensor network platform.

After obtaining the data packages, the accessories of the corresponding production line manufacturing equipment may be retrieved by the production line accessory supply equipment based on the index item information of the corresponding production line manufacturing equipment and the single allocation amount of the accessories.

After completing the retrieving, a supply step may be executed by the production line accessory supply equipment when the storage amount of the accessories of the production line accessory supply equipment is greater than or equal to the total amount of the accessories.

For further illustration, for example, the supply amount of the accessories of each production line manufacturing equipment corresponding to five production line manufacturing equipment are 35, 42, 73, 55, and 38, respectively, then the allocation amount of the accessories is obtained as 243 by adding the five supply amount of the accessories, and the single allocation amount of the accessories for each production line manufacturing equipment is as follows.

1) The total amount of the accessories $T_{total}$ is set to be 250, that is, the total amount of accessories is greater than the allocation amount of the accessories. According to the above formula (1), the single allocation amount of the accessories for each production line manufacturing equipment are 34.02, 40.82, 70.95, 53.46, and 36.93, respectively.

When the single allocation amount of the accessories of the production line manufacturing equipment has a decimal, because the single amount cannot be split, the decimal may be discarded and the integer may be used as the single allocation amount of the accessories to ensure that the accessories corresponding to the production line equipment are sufficient after the allocation. Therefore, the single allocation amount of the accessories for each production line manufacturing equipment are finally 34, 40, 70, 53, and 36, respectively.

2) The total amount of accessories $T_{total}$ is set to be 210, that is, the total amount of accessories is less than the allocation amount of the accessories. According to the above formula (2), the single allocation amount of the accessories for each production line manufacturing equipment are 30.24, 36.29, 63.08, 47.53, and 32.83, respectively, after discarding the decimal, the single allocation amount of the accessories for each production line manufacturing equipment mentioned above are finally 30, 36, 63, 47, and 32, respectively.

After the above method is used for allocation, the production line equipment of the required accessories may obtain a certain amount of the accessories in advance from other production line equipment that stores redundant accessories for manufacturing. While not affecting the manufacturing operations of itself and other production line equipment, the production line equipment has a margin to cope with the excess losses in production after the allocation of the above methods, which may also avoid the lag problem of accessories supply caused by the lack of accessories supply for the production line accessory supply equipment to meet the normal product manufacturing requirements.

Figure 2:
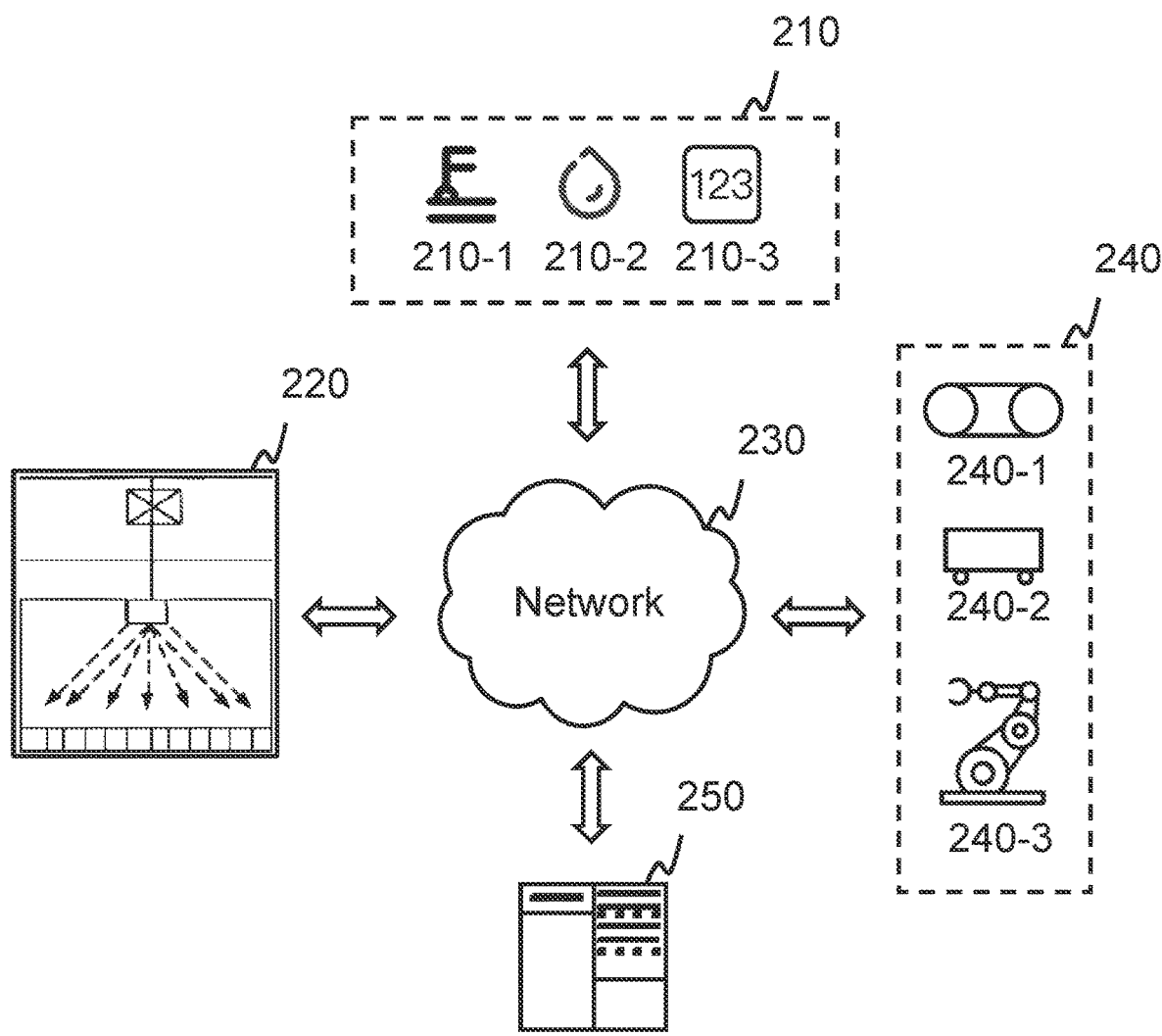
FIG. 2 is a schematic diagram of an application scenario of the industrial Internet of Things (IoT) of integrating centralized platforms and rear sub-platforms according to some embodiments of the present disclosure.

FIG. 2 is a schematic diagram of an application scenario of the industrial Internet of Things (IoT) of integrating centralized platforms and rear sub-platforms according to some embodiments of the present disclosure.

As shown in FIG. 2, the application scenario of a system 100 of the industrial Internet of Things (IoT) of integrating centralized platforms and rear sub-platforms includes equipment data collectors 210, an etching equipment 220, network 230, production line accessory supply equipment 240, and a management platform 250.

The equipment data collectors may be used to collect various information of the etching equipment. The equipment data collectors may include, but are not limited to, a liquid level gauge 210-1, a flowmeter 210-2, and a counter 210-3, etc.

The etching equipment may refer to various equipment for etching circuit boards. For example, the etching equipment may include, but is not limited to, a lithography machine, and an ion beam etching machine, etc.

The network 230 may include any suitable network that provides information and/or data exchange capable of facilitating application scenario 200. One or more components of application scenario 200 may exchange information and/or data through the network 230.

The production line accessory supply equipment may be used to supply the etching equipment with etching solution. The production line accessory supply equipment may include, but is not limited to, a conveyor belt 240-1, a trolley 240-2, a robotic arm 240-3, etc.

The management platform 250 may be used to manage etching operations.

The management platform 250 may be used to process data and/or information from at least one component of application scenario 200 or external data sources.

Figure 3:
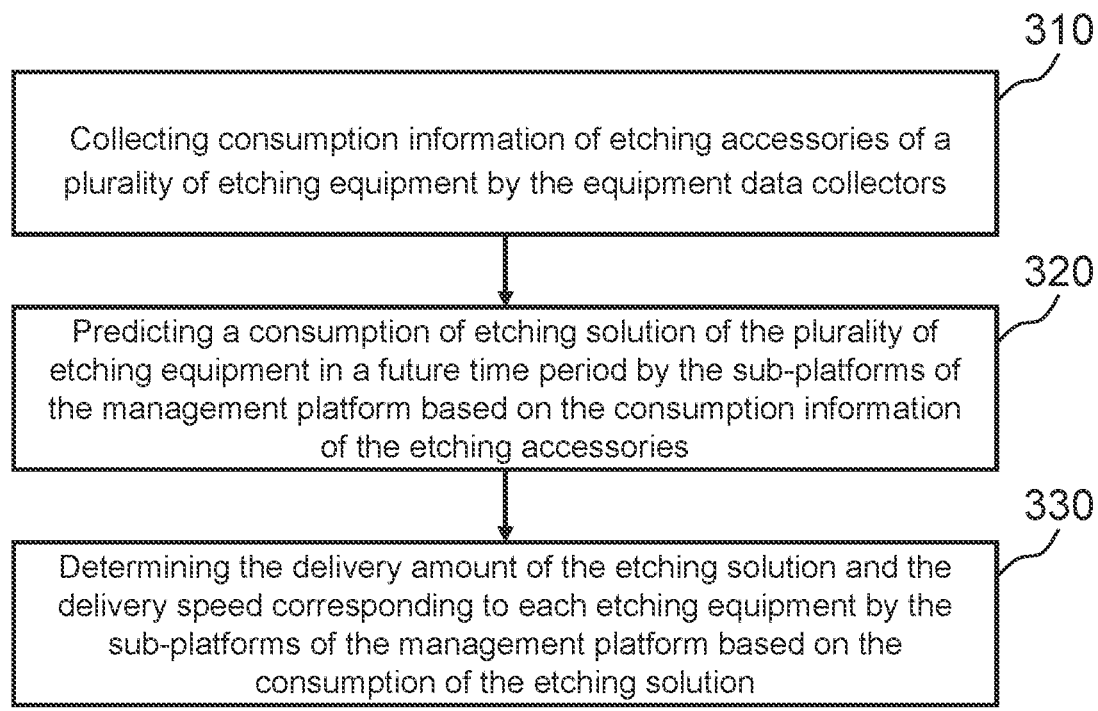
FIG. 3 is an exemplary flowchart for applying the industrial Internet of Things (IoT) of integrating centralized platforms and rear sub-platforms to etching operations according to some embodiments of the present disclosure.

FIG. 3 is an exemplary flowchart of the application of the industrial Internet of Things (IoT) of integrating centralized platforms and rear sub-platforms to etching operations according to some embodiments of the present disclosure. The process 500 may be performed by the industrial IoT of integrating centralized platforms and rear sub-platforms. In some embodiments, the process 500 may include one or more of the following operations.

When performing the etching operations, the production line manufacturing equipment may include a plurality of etching equipment.

In operation 310, collecting consumption information of etching accessories of a plurality of etching equipment by the equipment data collectors.

The etching accessories may include various equipment or raw materials required to etching circuit boards, such as a spray device, and etching solution, etc. The etching solution may refer to solution used to etch the circuit boards. The consumption information of etching accessories may refer to consumption information of an apparatus for etching circuit boards or consumption information of raw materials, for example, the wear and tear of the spray device, for another example, the consumption of etching solution.

In some embodiments, the equipment data collector may collect operation conditions of the device, and the object platform may determine the wear conditions of the device based on the operation conditions. For example, the equipment data collector may include a flowmeter. The flowmeter may be set at the spray port of the spray device to collect the spray volume and spray range of the spray device. The processing equipment on the object platform may determine the service life of the spray device based on the spray volume and the spray range. In some embodiments, the equipment data collectors may collect the remaining amount of the raw material. For example, the equipment data collector may include a liquid level gauge, the liquid level gauge may collect the liquid level of the etching solution in the container, and the processing equipment of the object platform may determine the consumption of the etching solution based on the liquid level.

In operation 320, predicting a consumption of etching solution of the plurality of etching equipment in a future time period by the sub-platforms of the management platform based on the consumption information of the etching accessories.

The consumption of the etching solution may refer to the amount of the etching solution used. The consumption of the etching solution may be obtained in various feasible ways.

In some embodiments, the sub-platforms of the management platform may predict the consumption of the etching solution corresponding to the etching equipment in the future time period according to the consumption and consumption speed of the etching solution of each etching equipment collected by the equipment data collectors. For example, the product of the spray speed of the etching solution and the future time period is taken as the consumption of the etching solution corresponding to the future time period.

In some embodiments, the sub-platforms of the management platform may determine the consumption of the etching solution based on the information of the etching solution and the working parameters of the etching equipment, which includes following contents.

The sub-platforms of the management platform may predict a unit etching speed and a unit consumption of the etching solution in a preset manner based on information of the etching solution in the consumption information of the etching accessories and working parameters of the etching equipment.

The information of the etching solution may include various information related to the etching solution. In some embodiments, the information of the etching solution may include, but is not limited to, a type of etching solution, an etching method, a chemical composition, density, a PH value, its corresponding content, and/or a reaction temperature, etc.

The etching method may be a method of etching the circuit boards by an etching device. The etching method may include, but is not limited to, immersion, bubble, spray, etc.

In some embodiments, the information of the etching solution may be collected by the equipment data collectors. For example, the chemical composition of the etching solution is obtained by using a composition detection device. For various information of the etching solution, the equipment data collectors may collect various information of the etching solution in various feasible ways.

The working parameters of the etching equipment may include operating parameters of the etching equipment when the etching operation is performed. The working parameters of the etching equipment may include but are not limited to the pressure of the nozzle, the etching method, etc.

The sub-platforms of the management platform may obtain the working parameters of the etching equipment in various feasible ways, which includes but not limited to determining the etching speed according to the chemical composition of the etching solution, etc.

The preset manner may refer to the preset manner for predicting the unit etching speed and the unit consumption of the etching solution.

The unit etching speed may refer to a speed of etching the circuit board in a unit time. The unit etching speed may be determined by the thickness of the circuit board etched per minute.

In some embodiments, the preset manner may be to determine the unit etching speed based on rules. For example, the concentration of the hydrofluoric acid etching solution used for etching the oxide film is 100:1, and the pressure of the nozzle of the etching equipment is 0.1 MPa. The unit etching speed is 100 μm/min through looking up the table. In some embodiments, the preset manner may also be other feasible manners, which includes but not limited to determining the unit etching speed based on formulas, models, etc.

The unit consumption of the etching solution may refer to the amount of etching solution consumed for etching the circuit board in a unit time. The unit consumption of the etching solution may be determined by the total amount of etching solution consumed per minute.

In some embodiments, the preset manner may be to determine the unit consumption of etching solution based on rules. For example, the concentration of the hydrofluoric acid etching solution used for etching the oxide film is 100:1, and the pressure of the nozzle of the etching equipment is 0.1 MPa. The unit consumption of the etching solution 50 mL/min through looking up the table. In some embodiments, the preset manner may also be other feasible manners, which includes but not limited to determining the unit consumption of the etching solution based on formulas, models, etc.

The sub-platforms of the management platform may determine the consumption of the etching solution based on the unit etching speed and the unit consumption of the etching solution.

In some embodiments, the sub-platforms of the management platform are provided with a first model. The sub-platforms of the management platform may predict the unit etching speed and the unit consumption of the etching solution through the first model based on the information of the etching solution and the working parameters of the etching equipment. More descriptions regarding the first model may be found elsewhere in the present disclosure, e.g., FIG. 4 and its relevant descriptions thereof.

In some embodiments, the sub-platforms of the management platform may determine the consumption of the etching solution based on the unit etching speed and the multiple relationship between the unit consumption of the etching solution and the etching time. For example, the speed of etching the circuit board is 100 μm/min, and the thickness of the circuit board to be etched is 200 μm, so the etching time required for etching the circuit board is 2 min. Under the condition that the unit consumption of the etching solution is 50 mL/min, the consumption of the etching solution for etching each circuit board is 100 mL.

In some embodiments of the present disclosure, the unit etching speed and the unit consumption of the etching solution are determined, and then the consumption of the etching solution is determined based on the unit etching speed and the unit consumption of the etching solution, causing that the sub-platforms of the management platform may more flexibly determine the consumption of the etching solution at a certain time point in the future.

In operation 330, determining the delivery amount of the etching solution and the delivery speed corresponding to each etching equipment by the sub-platforms of the management platform based on the consumption of the etching solution.

The delivery amount of the etching solution may be the volume of the etching solution that the production line accessory supply equipment supplies for the etching equipment.

In some embodiments, the sub-platforms of the management platform may determine the consumption of the etching solution as the delivery amount of the etching solution.

In some embodiments, the user may set a threshold of the etching solution in the etching equipment through the user platform and determine the delivery amount of etching solution based on the threshold and the consumption of the etching solution. More descriptions regarding the threshold and determining the delivery amount of the etching solution may be found elsewhere in the present disclosure, e.g., FIG. 5 and its relevant descriptions thereof.

The delivery time of the etching solution may refer to time when the production line accessory supply equipment supplies the etching solution for the etching equipment.

In some embodiments, the sub-platforms of the management platform may set the threshold of the etching solution in the etching device. When the amount of the etching solution is less than the threshold, the production line accessory supply equipment is instructed to supply the etching solution corresponding to the etching equipment. More descriptions regarding the threshold may be found elsewhere in the present disclosure, e.g., FIG. 5 and its relevant descriptions thereof.

In some embodiments of the present disclosure, the etching equipment is managed uniformly through the IoT technology, so that uniform supply and resource allocation for the etching equipment may be performed more effectively, and the waste of resources is reduced.

Figure 4:
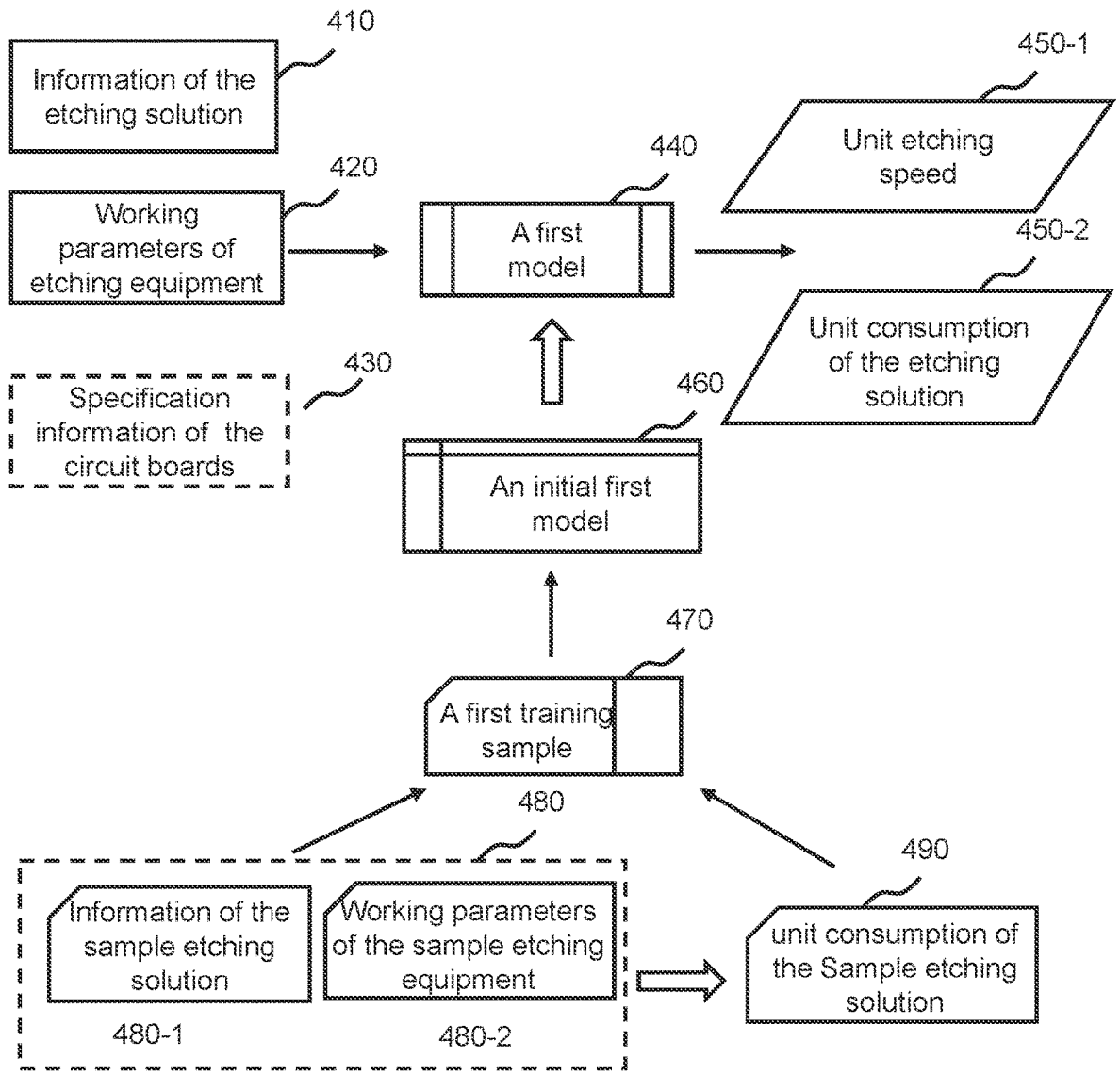
FIG. 4 is an exemplary schematic diagram of function and training of a first model according to some embodiments of the present disclosure.

FIG. 4 is an exemplary schematic diagram of function and training of a first model according to some embodiments of the present disclosure. The process illustrated in the process 400 may be performed by the sub-platforms of the management platform. In some embodiments, the process illustrated in the process 400 may include the following contents.

In some embodiments, the information of the etching solution 410 and the working parameters of the etching equipment 420 may be input into a first model 440 by the sub-platforms of the management platform, and the first model 440 may output the unit etching speed 450-1 and the unit consumption of the etching solution 450-2.

The first model may be a machine learning model for predicting the unit etching speed and the unit consumption of the etching solution. The first model includes, but is not limited to, a recurrent neural network (RNN), a long short-term memory model (LSTM), and an encoder-decoder model, etc. For example, the sub-platforms of the management platform may obtain the information of the etching solution and the working parameters of the etching equipment at multiple time points in time sequence, and then input the information of the etching solution and the working parameters of the etching equipment at multiple time points into the RNN. The RNN extracts the features of each time point, and then predicts the unit etching speed and unit consumption of the etching solution for multiple future time periods based on the features of each time point.

In some embodiments, the equipment data collectors may also collect specification information of the circuit boards 430, and the input of the first model may further include specification information of the circuit boards 430, and the circuit boards may be an etched circuit board.

The specification information of the circuit boards may be various information related to the specification of the circuit boards. The specification information of the circuit boards 430 includes but is not limited to size of the circuit boards, replacement time of the circuit boards, material, thickness of the copper foil layer, etc.

In some embodiments, the equipment data collector may obtain the specification information of the circuit boards in various feasible ways.

In some embodiments of the present disclosure, the specification information of the circuit boards may be input into the first model, the first model may adjust the predicted unit etching speed and the unit consumption of the etching solution according to the specification information of the circuit boards, which can avoid a large difference between the unit consumption of the etching solution output by the first model and the actual consumption. It may be appreciated that the size of the circuit boards will affect the volume of the required etching solution, and the thickness of the copper foil layer will affect the required etching time of the circuit boards. For example, the larger the circuit boards are, the more etching solution required by the spray device is; the thicker the copper foil layer is, the longer the etching time is. For the production line for etching circuit boards, it will involve the process of outputting the etched circuit boards and inputting the circuit boards to be etched. When the circuit boards are replaced, the etching solution is not used, so the unit consumption of the etching solution and the unit etching speed are predicted based on the etching time after removing the replacement time, which makes the prediction result more accurate.

In some embodiments, the sub-platforms of the management platform may adopt various data analysis algorithms to analyze the information of the etching solution and the working parameters of the etching equipment to obtain the first model, for example, regression analysis, discriminant analysis, etc.

In some embodiments, the sub-platforms of the management platform may obtain the information of the sample etching solution 480-1 and the working parameters of the sample etching equipment 480-2.

The information of the sample etching solution may refer to the information of the etching solution used to train the first model. The working parameters of the sample etching equipment may refer to the working parameters of the etching equipment used for training the first model. In some embodiments, the sub-platforms of the management platform may obtain information of the sample etching solution and working parameters of the sample etching equipment from historical data. The historical data may refer to the information of the etching solution and the working parameters of the etching equipment during the previous etching operation.

In some embodiments, the sub-platforms of the management platform may mark the sample unit etching speed and the unit consumption of the sample etching solution 490 based on the information of the sample etching solution 480-1 and the working parameters of the sample etching equipment 480-2.

For example, the sub-platforms of the management platform may extract corresponding unit etching speed and unit consumption of the etching solution from historical data according to the information of the sample etching solution and the working parameters of the sample etching equipment.

In some embodiments, the sub-platforms of the management platform may use the information of the marked sample etching solution and the working parameters of the sample etching equipment as a first training sample 470, input the first training sample 470 into an initial first model 460 for training to obtain the first model 440.

For example, the sub-platforms of the management platform may construct a loss function by the labels and the results of the initial first model, and iteratively update the parameters of the initial first model based on the loss function. When the loss function of the initial first model satisfies the condition, the model training is completed, and the trained first model is obtained. The conditions may include the convergence of the loss function, the number of iterations reaching a threshold, etc. Methods for training the first model include, but are not limited to, gradient descent, regularization, and conjugate gradient methods, etc.

In some embodiments of the present disclosure, the first model is used to predict the unit etching speed and the unit consumption of the etching solution, which improves the accuracy and speed of the predicted results.

Figure 5:
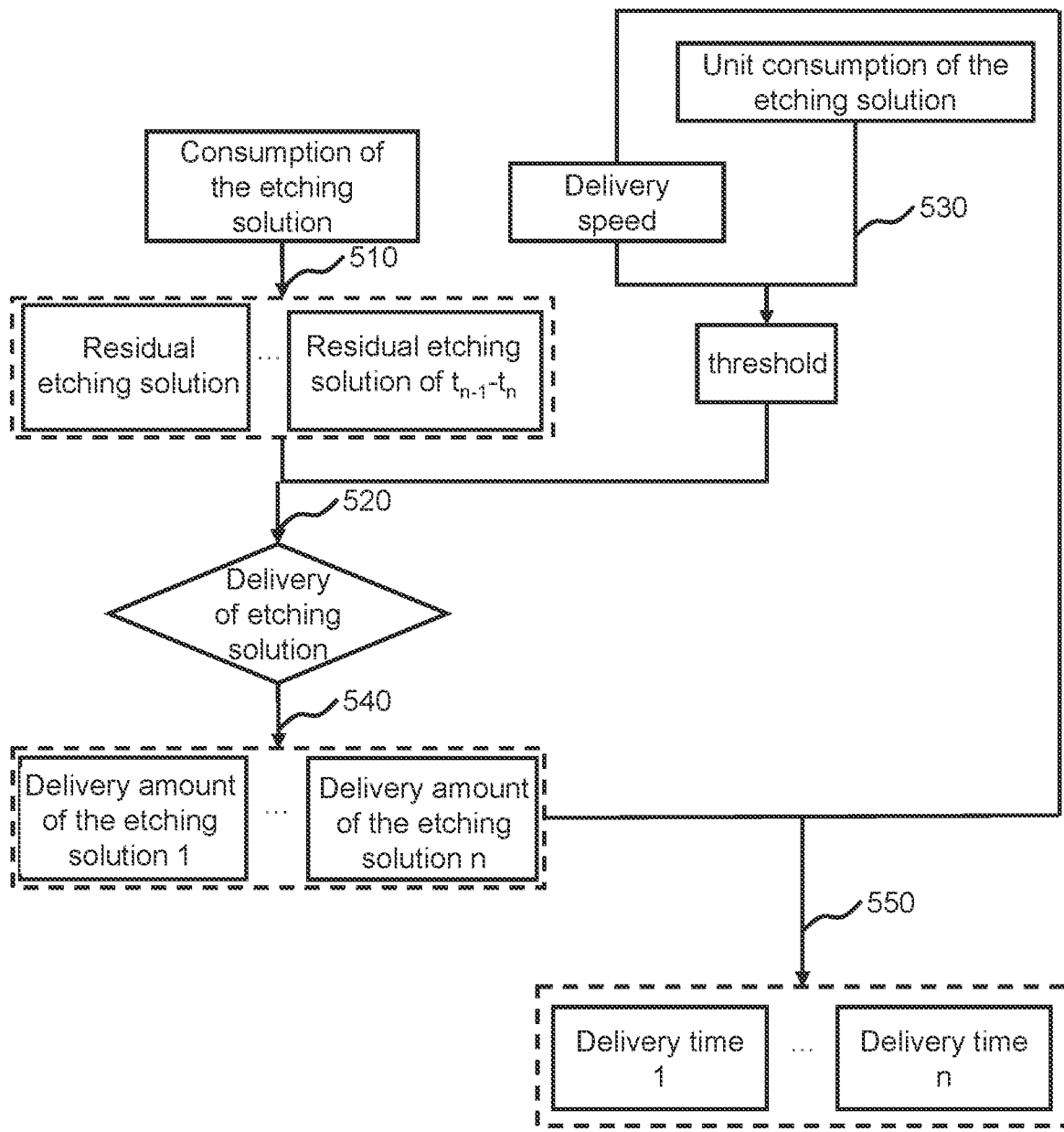
FIG. 5 is an exemplary schematic diagram for determining delivery amount of the etching solution and delivery time according to some embodiments of the present disclosure.

FIG. 5 is an exemplary schematic diagram for determining delivery amount of the etching solution and delivery time according to some embodiments of the present disclosure. The process illustrated in the process 500 may be performed by the sub-platforms of the management platform. In some embodiments, the process illustrated in process 500 may include the following operations.

In operation 510, determining a residual etching solution in the future time period based on a predicted consumption of the etching solution.

The residual etching solution may refer to the amount of the etching solution remaining in the etching equipment.

In some embodiments, the equipment data collectors may collect the current amount of etching solution of the etching equipment, the management device may determine the difference between the current amount of the etching solution and the predicted consumption of the etching solution as the residual etching solution.

In operation 520, if the residual etching solution is less than the threshold, determining that the etching equipment needs to deliver the etching solution.

The threshold may be a minimum residual etching solution for supplying the etching solution into the etching equipment, which is preset according to experience or operational requirements. In some embodiments, the threshold may be adjusted based on the delivery speed. For example, the faster the delivery speed is, the lower the threshold is; the slower the delivery speed is, the higher the threshold is.

In some embodiments of the present disclosure, it is determined whether it is necessary to deliver etching solution based on the relationship between the residual etching solution and the threshold, which can avoid resource waste caused by delivering at any time and also avoid production accidents caused by untimely delivering.

In operation 530, determining the threshold based on the difference between the unit consumption of the etching solution and the delivery speed.

The delivery speed may reflect a delivery speed when the production line accessory supply equipment supplies the etching solution for the etching equipment. In some embodiments, the delivery speed may be expressed in terms of a unit speed or a total delivery time. For example, the amount of the etching solution supplied by the production line accessory supply equipment per minute. For another example, the time taken by the production line accessory supply equipment to supply the required etching solution to the etching equipment after receiving the delivery instruction.

In some embodiments, there may be a plurality of production line accessory supply equipment to independently supply different etching equipment.

In some embodiments, the equipment data collectors may obtain the delivery speed through a speed sensor provided on the production line accessory supply equipment.

In some embodiments, the main platform of the management platform may obtain a count of the plurality of etching equipment that need to be delivered, and a total amount of the plurality of etching equipment that need to be delivered.

The main platform of the management platform may obtain the count of the etching equipment that need to be delivered through various feasible ways.

The total amount of the plurality of etching equipment that need to be delivered may be a sum of the amount of the required etching solution of the etching equipment that need to be delivered In some embodiments, the sub-platforms of the management platform may send the information of the etching solution of the etching equipment that need to be delivered to the main platform of the management platform, and the main platform of the management platform may obtain the total amount of the plurality of etching equipment that need to be delivered through adding the amount of the etching solution.

In some embodiments, the main platform of the management platform may determine the delivery speed through historical statistics based on the count of the plurality of etching equipment that need to be delivered and the total amount of the plurality of etching equipment that need to be delivered.

The historical data may be the data for supplying the etching solution to the etching equipment in the history of the production line accessory supply equipment. The historical data may include the delivery amount of the etching solution, and the delivery time of the etching solution, etc.

In some embodiments, the historical statistics may include the historical delivering total amount and the historical delivery time, and the delivery speed may be determined based on the multiple relationship between the historical delivering total amount and the historical delivery time. For example, the delivery speed is a value obtained by dividing the historical delivering total amount by the historical delivery time.

In some embodiments of the present disclosure, the delivery speed is determined by historical statistics, causing the obtained delivery speed more accurate.

In some embodiments, the sub-platforms of the management platform may determine the threshold based on the difference between the delivery speed and the unit consumption of the etching solution, the etching time that is maintained by the residual etching solution, and a preset remaining amount. The preset remaining amount may be an amount that the etching solution in the preset etching equipment should be larger than. For example, threshold=|delivery speed−unit consumption of etching solution|×unit remaining amount of etching solution/unit consumption of etching solution+preset remaining amount.

In some embodiments, the threshold may be also related to the confidence of the first model. For example, if the confidence level of the model is low, it indicates that the result output by the model has a large error, so the threshold may be adjusted upwards. The confidence of the model may refer to a degree of confidence in the correctness of the output of the model to solve a certain problem. In some embodiments, the confidence may be determined based on historical data. For example, compare the actual unit consumption of the etching solution and unit etching speed with the predicted unit consumption of the etching solution and the predicted unit etching speed. Exemplarily, the sub-platforms of the management platform may determine the confidence based on the confidence interval formed by the actual etching speed and the predicted unit etching speed. Exemplarily, when the length of the confidence interval is greater than 10 mL, it indicates that the confidence of the model is low, when the length of the confidence interval is less than 5 mL, it indicates that the confidence of the first model is high. For another example, the sub-platforms of the management platform may determine a confidence based on the difference between the expected actual unit consumption of the etching solution and the predicted unit consumption of the etching solution by the first model.

In operation 540, determining the delivery amount of the etching solution by the sub-platforms of the management platform based on the difference between the residual etching solution and the threshold.

In some embodiments, the sub-platforms of the management platform may determine the sum of the difference between the residual etching solution and the threshold and the preset remaining amount as the delivery amount of the etching solution. The sub-platforms of the management platform may also determine the delivery amount of the etching solution in other feasible ways.

In operation 550, obtaining a delivery speed of the production line accessory supply equipment.

More descriptions regarding delivery speed of the production line accessory supply equipment and obtaining delivery speed of the production line accessory supply equipment, may be found elsewhere in operation 530 and its relevant descriptions thereof.

In operation 560, determining the delivery time of each etching equipment based on the delivery amount of the etching solution and the delivery speed corresponding to each etching equipment.

In some embodiments, the sub-platforms of the management platform may obtain the required delivery time of each etching equipment through dividing the required delivery amount of the etching equipment by the corresponding delivery speed. Further, the sub-platforms of the management platform may also determine a priority level of the delivering based on the delivery time and the residual etching solution and deliver the etching equipment in the order of the priority level.

In some embodiments of the present disclosure, the delivery time is determined based on the delivery amount of the etching solution and the delivery speed, which can ensure timely supply of etching equipment and avoid production accidents.

Figure 6:
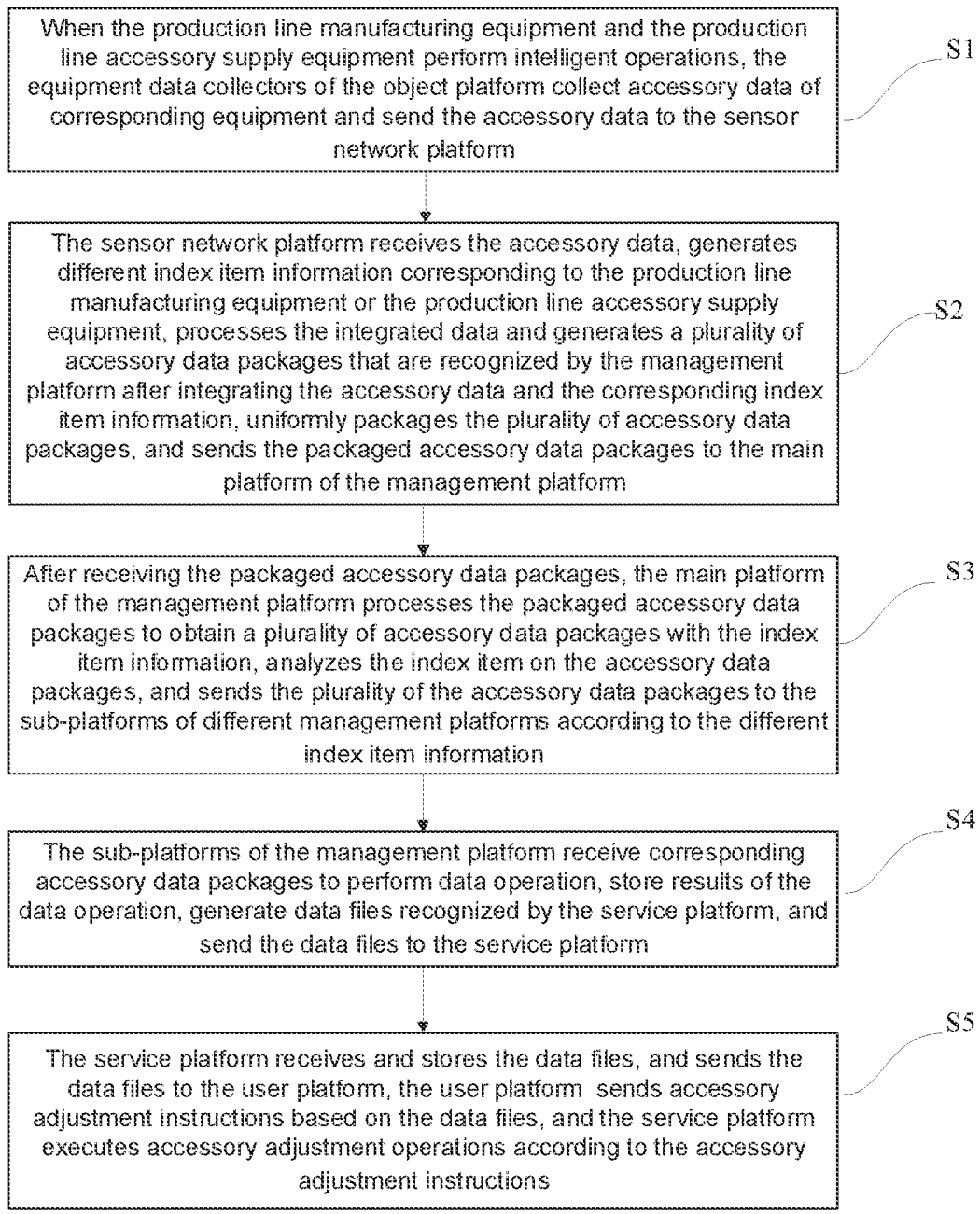
FIG. 6 is a flowchart of a control method for an industrial Internet of Things (IoT) of integrating centralized platforms and rear sub-platforms according to some embodiments of the present disclosure.

FIG. 6 is a flowchart of a control method for an industrial Internet of Things (IoT) of integrating centralized platforms and rear sub-platforms according to some embodiments of the present disclosure. As shown in FIG. 6, some embodiments of the present disclosure also provide a control method for an industrial Internet of Things (IoT) of integrating centralized platforms and rear sub-platforms, the industrial IoT includes a user platform, a service platform, a management platform, a sensor network platform, and an object platform interacting in sequence.

Both the service platform and the sensor network platform may be arranged using a centralized platform arrangement, and the management platform may be arranged using a rear sub-platform arrangement. The centralized platform arrangement may refer to that the service platform or the sensor network platform may uniformly receive data, uniformly process data, and uniformly send data, the rear sub-platform arrangement may refer to the management platform provided with a main platform and a plurality of sub-platforms, the main platform uniformly may receive data uploaded by the sensor network platform, and send the data to corresponding sub-platforms according to a type of the data or data uploaded by different objects, and the plurality of sub-platforms further may store and process the received data and send the data to the service platform, the plurality of sub-platforms may respectively store and process the data of different types or different receiving objects sent by the service platform, and the main platform may store, process, and transmit the data to the sensor network platform after summarizing the data of the plurality of sub-platforms.

The control method includes following operations.

Production line equipment of the object platform may be divided into production line manufacturing equipment and production line accessory supply equipment according to classification, and each of the production line manufacturing equipment and each of the production line accessory supply equipment may be configured with equipment data collectors of the object platform.

When the production line manufacturing equipment and the production line accessory supply equipment perform intelligent operations, the equipment data collectors of the object platform collect accessory data of corresponding equipment and send the accessory data to the sensor network platform.

The sensor network platform receives the accessory data, generates different index item information corresponding to the production line manufacturing equipment or the production line accessory supply equipment, processes the integrated data and generate a plurality of accessory data packages that are recognized by the management platform after integrating the accessory data and the corresponding index item information, uniformly packages the plurality of accessory data packages, and sends the packaged accessory data packages to the main platform of the management platform.

After receiving the packaged accessory data packages, the main platform of the management platform processes the packaged accessory data packages to obtain a plurality of accessory data packages with the index item information, analyzes the index item on the accessory data packages, and sends the plurality of the accessory data packages to the sub-platforms of different management platforms according to the different index item information.

The sub-platforms of the management platform receive corresponding accessory data packages to perform data operation, store results of the data operation, generate data files recognized by the service platform, and send the data files to the service platform.

The service platform receives and stores the data files, and sends the data files to the user platform, the user platform sends accessory adjustment instructions based on the data files, and the service platform executes accessory adjustment operations according to the accessory adjustment instructions.

Those of ordinary skill in the art can realize that the units and algorithm operations of each example described in conjunction with the embodiments disclosed herein can be implemented in electronic hardware, computer software, or a combination of the two, in order to clearly illustrate the differences between hardware and software Interchangeability, the above description has generally described the components and operations of each example in terms of function. Whether these functions are performed in hardware or software depends on the specific application and design constraints of the technical solution. Skilled artisans may implement the described functionality using different methods for each particular application, but such implementation should not be considered beyond the scope of the present disclosure.

In the several embodiments provided in the application, it should be understood that the disclosed apparatus and method may be implemented in other manners. For example, the apparatus embodiments described above are only illustrative. For example, the division of the units is only a logical function division. In actual implementation, there may be other division methods. For example, multiple units or components may be combined or may be integrated into another system, or some features may be omitted, or not implemented. In addition, the shown or discussed mutual coupling or direct coupling or communication connection may be indirect coupling or communication connection through some interfaces, devices or units, or may be electrical, mechanical or other forms of connection.

The unit described as a separate component may or may not be physically separated. As a unit, those of ordinary skill in the art can realize that the unit and algorithm operations of each example described in conjunction with the embodiments disclosed herein can be used. It is implemented by electronic hardware, computer software or a combination of the two. In order to clearly illustrate the interchangeability of hardware and software, the above description has generally described the components and operations of each example in terms of functions. Whether these functions are performed in hardware or software depends on the specific application and design constraints of the technical solution. Skilled artisans may implement the described functionality using different methods for each particular application, but such implementations should not be considered beyond the scope of the present disclosure.

In addition, each functional unit in each embodiment of the present disclosure may be integrated into one processing unit, or each unit may exist physically alone, or two or more units may be integrated into one unit. The above-mentioned integrated units may be implemented in the form of hardware or software functional units.

The integrated unit, if implemented in the form of a software functional unit and sold or used as an independent product, may be stored in a computer-readable storage medium. Based on the understanding, the technical solution of the present disclosure is essentially or a part that contributes to the prior art, or all or part of the technical solution may be embodied in the form of a software product, and the computer software product is stored in a storage medium, including several instructions for causing a computer device (which may be a personal computer, a server, or a grid device, etc.) to execute all or part of the operations of the methods described in the various embodiments of the present disclosure. The aforementioned storage medium includes: a USB flash disk, a mobile hard disk, a Read-Only Memory (ROM), a Random Access Memory (RAM), a magnetic disk or an optical disk and other medias that can store program codes. The specific embodiments described above further describe the objectives, technical solutions and beneficial effects of the present disclosure in detail. It should be understood that the above descriptions are only specific embodiments of the present disclosure, and not intended to limit the scope of the present disclosure. The protection scope, any modification, equivalent replacement, improvement, etc. made within the spirit and principle of the present disclosure shall be included within the protection scope of the present disclosure.

What is claimed is:

1. An industrial Internet of Things (IoT) of integrating centralized platforms and rear sub-platforms, comprising a user platform, a service platform, a management platform, a sensor network platform, and an object platform interacting in sequence, wherein
   both the service platform and the sensor network platform are arranged using a centralized platform arrangement, and the management platform is arranged using a rear sub-platform arrangement; the centralized platform arrangement refers to that the service platform or the sensor network platform uniformly receives data, uniformly processes data, and uniformly sends data; the rear sub-platform arrangement refers to the management platform provided with a main platform and a plurality of sub-platforms, the main platform uniformly receives data uploaded by the sensor network platform, and sends the data to corresponding sub-platforms according to a type of the data or data uploaded by different objects, and the plurality of sub-platforms further store and process the received data and send the data to the service platform; the plurality of sub-platforms respectively store and process the data of different types or different receiving objects sent by the service platform, the main platform stores, processes, and transmits the data to the sensor network platform after summarizing the data of the plurality of sub-platforms;
   production line equipment of the object platform is divided into production line manufacturing equipment and production line accessory supply equipment according to classification, and each of the production line manufacturing equipment and each of the production line accessory supply equipment are configured with equipment data collectors of the object platform;
   when the production line manufacturing equipment and the production line accessory supply equipment perform intelligent operations, the equipment data collectors of the object platform collect accessory data of corresponding equipment and send the accessory data to the sensor network platform;
   the sensor network platform receives the accessory data, generates different index item information corresponding to the production line manufacturing equipment or the production line accessory supply equipment, processes the integrated data and generates a plurality of accessory data packages that are recognized by the management platform after integrating the accessory data and the corresponding index item information, uniformly packages the plurality of accessory data packages, and sends the packaged accessory data packages to the main platform of the management platform;
   after receiving the packaged accessory data packages, the main platform of the management platform processes the packaged accessory data packages to obtain a plurality of accessory data packages with the index item information, analyzes the index item on the accessory data packages, and sends the plurality of the accessory data packages to the sub-platforms of different management platforms according to the different index item information;
   the sub-platforms of the management platform receive corresponding accessory data packages to perform data operation, store results of the data operation, generate data files recognized by the service platform, and send the data files to the service platform; and
   the service platform receives and stores the data files, and sends the data files to the user platform, the user platform sends accessory adjustment instructions based on the data files, and the service platform executes accessory adjustment operations according to the accessory adjustment instructions.

2. The industrial IoT of claim 1, wherein the equipment data collectors of the object platform collect accessory data of corresponding equipment including:
   collecting a storage amount of accessories of the corresponding equipment and consumption time of a single accessory by the equipment data collectors of the production line manufacturing equipment, and
   collecting a storage amount of accessories of the corresponding equipment by the equipment data collectors of the production line accessory supply equipment.

3. The industrial IoT of claim 2, wherein the data operation includes:
  when the sub-platforms of the management platform correspond to the production line manufacturing equipment, receiving the accessory data packages and calculating a total amount of the required accessories within a total required working hour according to following formula by the sub-platforms of the corresponding management platform:

$S=T_{total}/T_{single}$ where S means the total amount of the required accessories, $T_{total}$ means the total working hour, $T_{single}$ means the consumption time of a single accessory, and the total working hour means total time preset by the sub-platforms of the management platform based on production tasks; and
  obtaining a supply amount of the accessories using the total amount of the required accessories minus the storage amount of the accessories, wherein the supply amount of the accessories retains positive sign and negative sign, and generating the data files recognized by the service platform and sending the data files to the service platform after storing the supply amount of the accessories.

4. The industrial IoT of claim 3, wherein the service platform executes accessory adjustment operations according to the accessory adjustment instructions including:
  after receiving the accessory adjustment instructions, obtaining a total supply amount of the accessories through summing absolute values of the supply amount of the accessories with the negative sign by the service platform;
  when the storage amount of the accessories of the production line accessory supply equipment is greater than or equal to the total supply amount of the accessories, sending supply instructions to the sub-platforms of the management platform corresponding to the production line accessory supply equipment by the service platform, the supply instructions at least including the index item information of the production line equipment corresponding to the supply amount of the accessories with negative signs and the absolute values of the supply amount of the accessories;
  after receiving the supply instructions, storing the supply instructions and sending the supply instructions to the main platform of the management platform by the sub-platforms of the management platform;
  after receiving the supply instructions, analyzing the supply instructions, integrating the corresponding index item information and the absolute values of the accessory supply amount, packaging the integrated data to generate data packages recognized by the sensor network platform, and sending the data packages to the sensor network platform by the main platform of the management platform;
  receiving the data packages, generating configuration files recognized by the corresponding production line accessory supply equipment, and sending the configuration files to the production line accessory supply equipment by the sensor network platform; and
  supplying the accessories on different production line manufacturing equipment by the production line accessory supply equipment based on the corresponding index item information in the data packages and the absolute values of the supply amount of the accessories.

5. The industrial IoT of claim 4, further including:
  when the storage amount of the accessories of the production line accessory supply equipment is less than the total amount of required accessories, obtaining a supply difference of the accessories using the total amount of the accessories minus the storage amount of the accessories;
  based on the supply difference of the accessories,
    issuing the supply instructions to the sub-platforms of the management platform corresponding to the production line accessory supply equipment by the service platform, and supplying accessories with an amount being greater than or equal to the supply difference of the accessories by the production line accessory supply equipment after obtaining the supply instructions; and
    after completing the supplying, executing a supply step when the storage amount of the accessories of the production line accessory supply equipment is greater than or equal to the total amount of the accessories by the production line accessory supply equipment.

6. The industrial IoT of claim 5, further including:
  when the service platform sends the supply instructions to the sub-platforms of the management platform corresponding to the production line accessory supply equipment and the production line accessory supply equipment fail to supply the accessories after obtaining the supply instructions,
  retrieving the index item information of the production line manufacturing equipment corresponding to the supply amount of the accessories with positive signs and the supply amount of the accessories, and obtaining an allocation amount of the accessories through summing the supply amount of the accessories by the service platform;
  obtaining a single allocation amount of the accessories for each production line manufacturing equipment according to following formulas:
  when the total amount of the accessories is greater than the allocation amount of the accessories, obtaining the single allocation amount of the accessories for each production line manufacturing equipment according to formula (1):

$S=S'/T_{total}\times S_{total}$ (1)

when the total amount of the accessories is less than the allocation amount of the accessories, obtaining the single allocation amount of the accessories for each production line manufacturing equipment according to formula (2):

$S=S'/S_{total}\times T_{total}$ (2)

where S means the single allocation amount of the accessories for each production line manufacturing equipment, S' means the supply amount of the accessories of the corresponding production line manufacturing equipment, $S_{total}$ means the allocation amount of the accessories, and $T_{total}$ means the total amount of the accessories;
  after integrating the index item information of the corresponding production line manufacturing equipment and the single allocation amount of the accessories, packaging and sending the data packages to the sub-platforms of the management platform corresponding to the production line accessory supply equipment, and then after packaging through the main platform of the management platform, sending the data packages to the production line accessory supply equipment through the sensor network platform;

after obtaining the data packages, retrieving the accessories of the corresponding production line manufacturing equipment by the production line accessory supply equipment based on the index item information of the corresponding production line manufacturing equipment and the single allocation amount of the accessories; and after completing the retrieving, executing a supply step by the production line accessory supply equipment when the storage amount of the accessories of the production line accessory supply equipment is greater than or equal to the total amount of the accessories.

7. The industrial IoT of claim 6, wherein when the single allocation amount of the accessories of the production line manufacturing equipment has a decimal, the decimal is discarded, and an integer is used as the single allocation amount of the accessories.

8. The industrial IoT of claim 2, wherein the data operation further includes:

when the sub-platforms of the management platform correspond to the production line accessory supply equipment, receiving the accessory data packages, directly storing the accessory data packages, and generating the data files recognized by the service platform and sending the data files to the service platform by the sub-platforms of the corresponding management platform.

9. The industrial IoT of claim 1, wherein the production line manufacturing equipment includes a plurality of etching equipment, and the equipment data collectors collect consumption information of etching accessories of the plurality of etching equipment;

the sub-platforms of the management platform predict a consumption of etching solution of the plurality of etching equipment in a future time period based on the consumption information of the etching accessories; and the sub-platforms of the management platform determine a delivery amount and a delivery time of the etching solution corresponding to each of the plurality of etching equipment based on the consumption of the etching solution.

10. The industrial IoT of claim 9, wherein the sub-platforms of the management platform predict a consumption of etching solution of the plurality of etching equipment in a future time period including:

predicting a unit etching speed and a unit consumption of the etching solution by a preset manner based on information of the etching solution in the consumption information of the etching accessories and working parameters of the etching equipment; and determining the consumption of the etching solution based on the unit etching speed and the unit consumption of the etching solution.

11. The industrial IoT of claim 10, wherein the information of the etching solution and the working parameters of the etching equipment are input into a first model, and the first model outputs the unit etching speed and the unit consumption of the etching solution.

12. The industrial IoT of claim 9, wherein the sub-platforms of the management platform determine a delivery amount of the etching solution corresponding to each of the plurality of etching equipment including:

determining a residual etching solution in the future time period based on the predicted consumption of the etching solution; and determining that the etching solution is needed to be delivered to the etching equipment when the residual etching solution is less than a threshold.

13. The industrial IoT of claim 9, wherein the sub-platforms of the management platform determine a delivery time of the etching solution corresponding to each of the plurality of etching equipment including:

obtaining a delivery speed of the production line accessory supply equipment; and determining the delivery time of each of the plurality of etching equipment based on the delivery amount of the etching solution and the delivery speed corresponding to each of the plurality of etching equipment.

14. The industrial IoT of claim 13, wherein the obtaining a delivery speed of the production line accessory supply equipment includes:

obtaining a count of the plurality of etching equipment that need to be delivered, and a total count of the plurality of etching equipment that need to be delivered; and determining the delivery speed through historical statistics based on the count of the plurality of etching equipment that need to be delivered and the total count of the plurality of etching equipment that need to be delivered.

15. A control method for an industrial Internet of Things (IoT) of integrating centralized platforms and rear sub-platforms, the industrial IoT including a user platform, a service platform, a management platform, a sensor network platform, and an object platform interacting in sequence, the control method comprising:

dividing production line equipment of the object platform into production line manufacturing equipment and production line accessory supply equipment according to classification, wherein each of the production line manufacturing equipment and each of the production line accessory supply equipment are configured with equipment data collectors of the object platform;

when the production line manufacturing equipment and the production line accessory supply equipment perform intelligent operations, collecting accessory data of corresponding equipment and sending the accessory data to the sensor network platform by the equipment data collectors of the object platform;

after receiving the accessory data packages by the sensor network platform, generating different index item information by the production line manufacturing equipment or the production line accessory supply equipment, after integrating the accessory data with the index item information, processing the integrated data and generating a plurality of accessory data packages that are recognized by the management platform, uniformly packaging the plurality of accessory data packages, and sending the plurality of accessory data packages to the main platform of the management platform;

after receiving the packaged accessory data packages, processing the packaged accessory data packages to obtain a plurality of accessory data packages with index item information, analyzing the index item on the accessory data packages, and sending the plurality of the accessory data packages to the sub-platforms of different management platforms according to the different index item information by the main platform of the management platform;

receiving corresponding accessory data packages to perform data operation, storing results of the data operation, generating data files recognized by the service platform, and sending the data files to the service platform by the sub-platforms of the management platform; and receiving and storing the data files, and sending the data files to the user platform by the service platform, sending accessory adjustment instructions based on the data files by the user platform, and executing accessory adjustment operations according to the accessory adjustment instructions by the service platform.

16. A non-transitory computer-readable storage medium storing a set of instructions, when executed by at least one processor, causing the at least one processor to perform a control method for the industrial Internet of Things (IoT) of integrating centralized platforms and rear sub-platforms, the control method comprising:

dividing production line equipment of the object platform into production line manufacturing equipment and production line accessory supply equipment according to classification, wherein each of the production line manufacturing equipment and each of the production line accessory supply equipment are configured with equipment data collectors of the object platform;

when the production line manufacturing equipment and the production line accessory supply equipment perform intelligent operations, collecting accessory data of corresponding equipment and sending the accessory data to the sensor network platform by the equipment data collectors of the object platform;

after receiving the accessory data packages by the sensor network platform, generating different index item information by the production line manufacturing equipment or the production line accessory supply equipment, after integrating the accessory data with the index item information, processing the integrated data and generating a plurality of accessory data packages that are recognized by the management platform, uniformly packaging the plurality of accessory data packages, and sending the plurality of accessory data packages to the main platform of the management platform;

after receiving the packaged accessory data packages, processing the packaged accessory data packages to obtain a plurality of accessory data packages with index item information, analyzing the index item on the accessory data packages, and sending the plurality of the accessory data packages to the sub-platforms of different management platforms according to the different index item information by the main platform of the management platform;

receiving corresponding accessory data packages to perform data operation, storing results of the data operation, generating data files recognized by the service platform, and sending the data files to the service platform by the sub-platforms of the management platform; and receiving and storing the data files, and sending the data files to the user platform by the service platform, sending accessory adjustment instructions based on the data files by the user platform, and executing accessory adjustment operations according to the accessory adjustment instructions by the service platform.

* * * * *